(12) United States Patent
Gabel

(10) Patent No.: US 9,521,933 B1
(45) Date of Patent: Dec. 20, 2016

(54) RETRACTABLE LEVER TOWEL CLAMP

(71) Applicant: John Alcantara Gabel, South San Francisco, CA (US)

(72) Inventor: John Alcantara Gabel, South San Francisco, CA (US)

( * ) Notice: Subject to any disclaimer, the term of this patent is extended or adjusted under 35 U.S.C. 154(b) by 0 days.

(21) Appl. No.: 14/726,605

(22) Filed: Jun. 1, 2015

(51) Int. Cl.
*A47K 10/14* (2006.01)
*A47K 10/04* (2006.01)
*F16B 2/10* (2006.01)

(52) U.S. Cl.
CPC ............... *A47K 10/14* (2013.01); *A47K 10/04* (2013.01); *F16B 2/10* (2013.01); *Y10T 24/4488* (2015.01); *Y10T 24/44453* (2015.01)

(58) Field of Classification Search
CPC ........... A47K 10/12; A47K 10/14; F16B 2/10; B42F 1/00; B42F 1/02; Y10T 24/44453; Y10T 24/4488; Y10T 24/44299; Y10T 24/44316; Y10T 24/44376; Y10T 24/44385; Y10T 24/44402; Y10T 24/44427; Y10T 24/44496; Y10T 24/4453; Y10T 24/44538; Y10T 24/4441

USPC ................. 24/502, 505, 508, 492, 496, 513, 24/515,24/517, 518, 558, 3.12, 30.5 R, 24/327, 334, 489,24/490, 500, 507, 564, 24/565

See application file for complete search history.

(56) References Cited

U.S. PATENT DOCUMENTS

| | | | | |
|---|---|---|---|---|
| 1,965,554 | A * | 7/1934 | Mainwaring | ........... B42F 1/006 24/558 |
| 5,946,778 | A * | 9/1999 | McGarity | ................. B42F 1/06 24/536 |
| 8,069,864 | B2 * | 12/2011 | Chininis | .................. A45D 8/20 132/277 |
| 8,104,149 | B1 * | 1/2012 | McGarity | .......... A61B 17/1227 24/508 |

* cited by examiner

*Primary Examiner* — Abigail Morrell

(57) ABSTRACT

An improved clamp that will keep the bath towels in place on a towel rack. The clamp consists of a pair of clamping pieces, each with a retractable lever, a clamping jaw, and two lugs. The clamping pieces are connected by a pivot pin through holes in the paired lugs. A torsion spring is mounted around the pivot pin to provide clamping force on the jaws to hold the towel on the rack. A rubber cylinder is mounted around the pivot pin and torsion spring to provide additional force. The ability to extend the retractable levers gives the user additional leverage to open the clamping jaws, and therefore to use the clamp. Conversely, the ability to retract the levers protects the user, as the retracted levers present a much lower risk of injury to the user's eyes and face.

12 Claims, 3 Drawing Sheets

RETRACTABLE LEVER TOWEL CLAMP

DETAILED DESCRIPTION

FIG. 1 shows the clamp with the retractable levers extended (FIG. 1A) and retracted (FIG. 1B). Those familiar with the art will realize that a change in the size and materials used in manufacturing will make the invention useful for other purposes. As a result, the invention can be used for many uses other than clamping towels to a rack. For purposes of clarity, the description below only discusses the clamp's use for holding towels to a rack.

FIG. 2 presents a side view of the clamp with the retractable levers extended and the clamp in the open position. FIG. 3 presents the same clamp, as viewed from the bottom. The piece numbers in the following paragraphs can be seen in both figures.

The clamp includes a pair of rectangular clamping pieces (1a and 1b). Each piece has a clamping jaw (2a and 2b), a sliding retractable lever (3a and 3b), and two pairs of lugs with pivot holes (4a and 4b). The clamping pieces are connected by a pivot pin (6) through the holes in the lugs (4a and 4b). Additional lugs can be incorporated, as necessary, for a larger sized clamp.

A torsion spring (7) is mounted around the pivot pin to bias the force on the clamping jaws (2a and 2b) towards each other and clamp the towel to the towel rack rod. The torsion spring can be single or double, depending on the size of the clamp. A rubber cylinder (8) is mounted around the pivot pin (6) and the torsion spring (7) to provide extra force to hold the towel down from the top of the towel rack rod.

FIG. 3 shows that the slides for the retractable levers (3a and 3b) are trapezoidal in shape, and that they engage with matching shape openings (9a and 9b) in the clamping pieces. The trapezoidal-shaped slides and openings can be replaced with a tongue-and-groove system, depending on the size of the clamp.

The spring tension mechanism assemblies (11a and 11b) ride on the slot [5a (b)] in the retractable levers while fixed in the holes [12a (b)] of the clamping pieces. These assemblies provides constant pressure to hold the retractable levers (3a and 3b) in place at any position, and serves as a stops for the slot [5a (b)]. The spring tension mechanism assemblies (11a and 11b) force the retractable levers against the matching floors (10a and 10b) in the clamping pieces. In the fully extended position, the spring tension mechanism assemblies butt against the extended slot stop positions [13a (b)] in slots [5a (b)]. As a result, the spring tension screw assemblies (11a and 11b) force the retractable levers to engage the lock detents (14a and 14b) against the clamping piece bases (15a and 15b). The user can then comfortably use finger pressure on the extended retractable lever handles (16a and 16b) to open the clamping jaws (2a and 2b) and clamp the towel to the rack. The rubber cylinder (8) stops the clamp from being pushed any further towards the top portion of the towel and rack, and provides added clamping force.

Since the user's face could be in close proximity to the clamp, the retractable levers should be fully retracted whenever the clamp is holding a towel on a towel rack. To fully retract the retractable levers (3a and 3b), the retractable lever handles (16a and 16b) are pushed outwards until released from the lock detents (14a and 14b) and disengaged from the clamping piece bases (15a and 15b). The retractable levers are then pressed down until they butt against the retracted stop positions [17a (b)] in slots [5a (b)]. The towel clamp can now be left safely in place on the rack, and has a smooth and elegant appearance.

To better present the operation of the extended and retracted position of the retractable lever, FIG. 4, FIG. 5, and FIG. 6 only show one clamping piece assembly. The operations of both clamping piece assemblies, however, are identical. FIG. 4 shows the retractable lever extended, FIG. 5 shows the retractable lever retracted, and FIG. 6 shows the expanded spring tension mechanism assembly. This assembly can be replaced with a piston-spring mechanism without changing the function of the clamp, yet allowing the clamp to vary in size and strength.

The spring tension mechanism assembly (FIG. 6) is composed of a shoulder screw (18) with an ultra-low shallow head (19), a washer (20), a spring (21), and a nut (22). This assembly is located in a hole near the clamping piece base (15) and between the lugs (4). The spring (21) is housed in the same hole in a recessed cavity (12) on the clamping piece. The shoulder screw (18) shoulder length, and washer (20) create a "fixed" space that is slightly larger than the total thickness of the clamping piece and retractable lever combined. The spring (21) provides constant pressure between the retractable lever (3) and the trapezoidal opening floor (10) of the clamping piece. As a result, this spring tension mechanism assembly holds the retractable lever at any position within the slot opening [see 5a (b) in FIG. 2 and FIG. 3]. When the retractable lever is fully extended, the spring (21) will force the retractable lever to tilt at the rounded nose edge (23) while the locking detent (14) engages against the clamping piece base (15). The spring tension mechanism also provides safety and strength when pressure is applied to the retractable lever handle (16). This "fixed" space eases the pressure on the trapezoidal sliding portion (24) of the retractable lever and the matching trapezoidal sliding walls (25) of the clamping piece opening (see 24a, 24b, 25a, and 25b in FIG. 3).

BRIEF DESCRIPTION OF THE DRAWINGS

Other features and advantages of the invention are apparent from the following.

BACKGROUND OF THE INVENTION

Figure 1A:
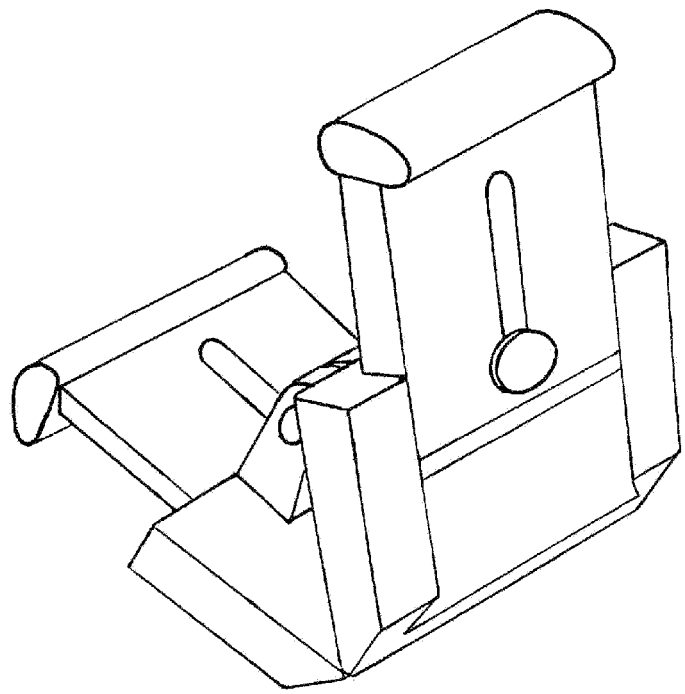
FIG. 1A shows the retractable lever towel clamp (i.e., the invention described in this application), with its retractable lever in the extended position.
Figure 1B:
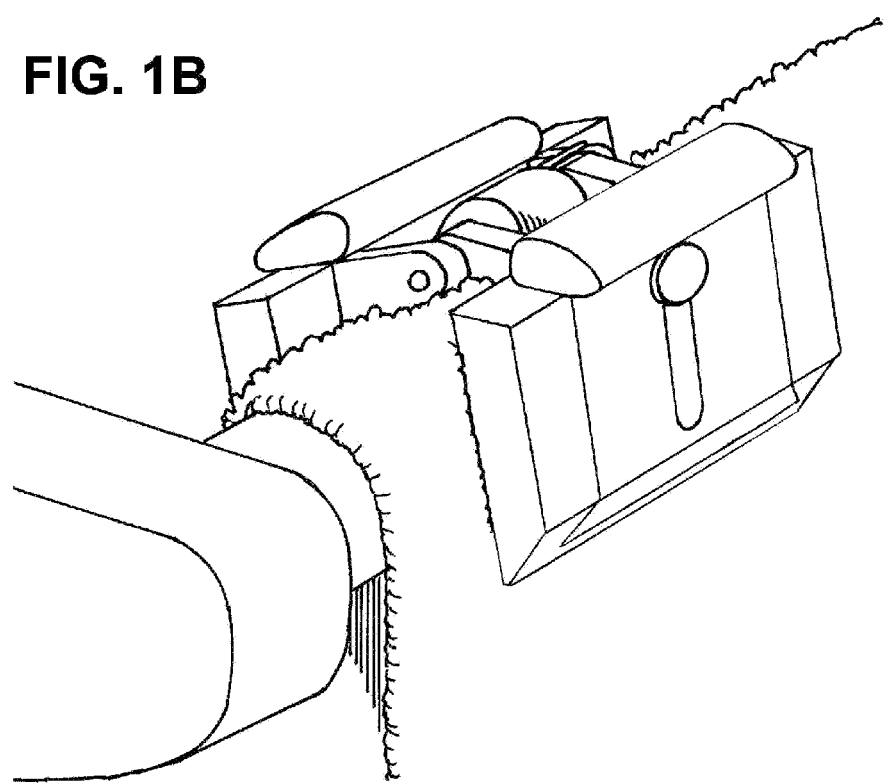
FIG. 1B is a perspective view of the retractable lever towel clamp in action, with its retractable levers stowed or retracted while clamping a towel to a towel rack rod.
Figure 2:
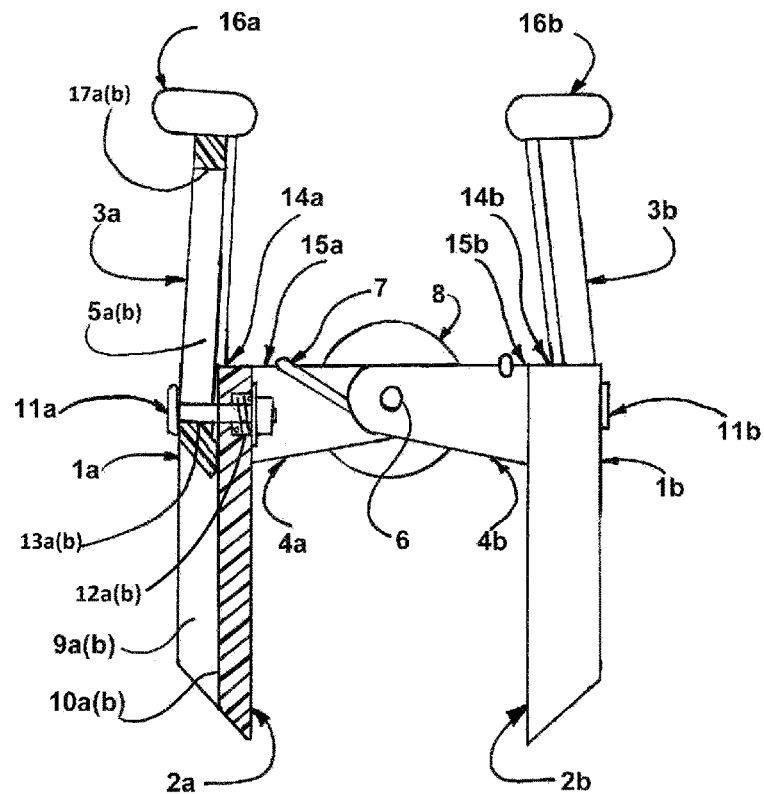
FIG. 2 is a side elevation and partial cross-sectional view of the retractable lever clamp. The retractable levers are fully extended and locked, while the clamping jaws are spread apart as if it wore about to clamp a towel.
Figure 3:
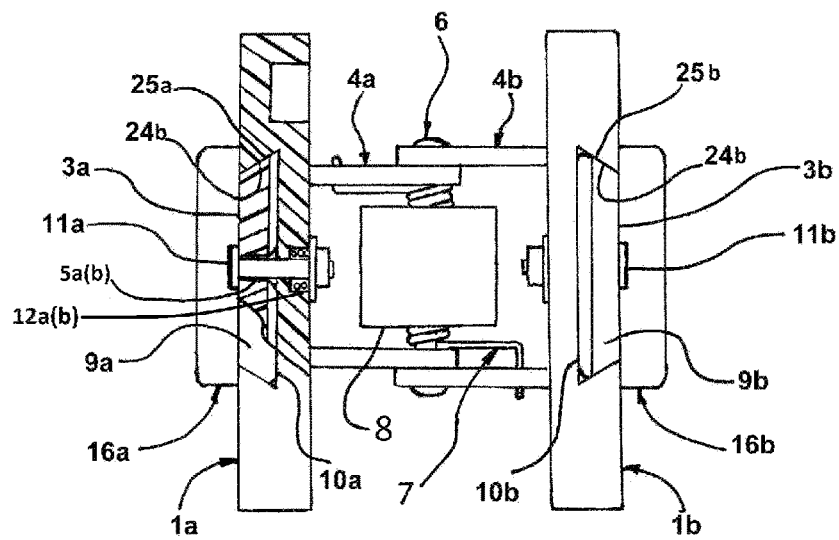
FIG. 3 is a bottom-view extension of FIG. 2, to reveal the trapezoidal sliding mechanism.
Figure 4:
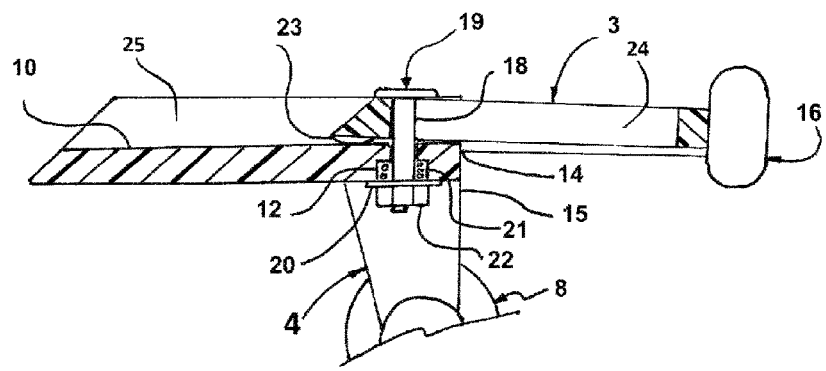
FIG. 4 accentuates the spring tension mechanism assembly function by showing only one clamping piece assembly, with the retractable lever in the full extended and locked position.
Figure 5:
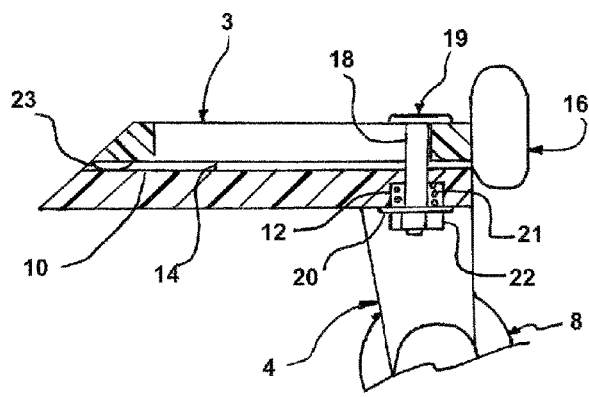
FIG. 5 is the counterpart to FIG. 4, with the retractable lever in the retracted and stowed position.
Figure 6:
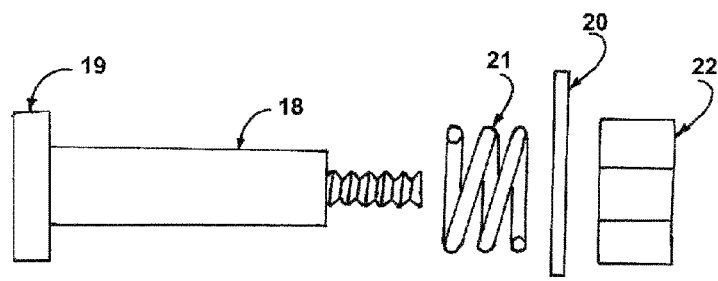
FIG. 6 is an enlarged portion of the spring tension mechanism assembly, broken down to show its construction.

The problem is putting bath or kitchen towels on the towel rack after use. The towel must be adjusted for aesthetics and held in place so that it does not fall on the floor. Common household prior art clamps have been used for this application, but modifications were needed to better hold the towels on the rack. Prior art clamps consist of protruding actuating levers to allow the clamp to open the clamping jaws. Those clamps are not aesthetically pleasing, however, and the levers can get in the way of things and possibly harm the user.

SUMMARY OF THE INVENTION

The present invention provides clamping pieces that house retractable and extendible retractable levers, a spring to urge the clamping jaws together, and a rubber cylinder around the spring that serves as an additional grip. The retractable levers can selectively slide to the extended position and lock to provide mechanical advantage in forcing the clamping jaws apart. Once the clamp is in place, the retractable levers can be unlocked and retracted to remove any protrusions for user safety and aesthetic purposes. The main parts of the clamp are made of varying colors of plastic and rubber materials that can be plated to match the surrounding décor. This invention can also be used in other applications and in any field to whatever suits its purpose. Numerous modifications may be made and the full use of equivalent resorted to, without departing from the spirit of the scope of the invention as outlined in the appended claims.

The invention claimed is:

1. A towel clamp comprising:
    a first clamping piece, the first clamping piece comprising:
        a first clamping jaw having a first opening;
        a first retractable lever defining a first handle and having a first slot, the first retractable lever being configured to slide within the first opening from a retracted position to a fully extended position; and
        a first spring tension mechanism fixed to the first clamping jaw, the first spring tension mechanism being configured to directly contact an upper end of the first slot when the first retractable lever is in the retracted position and directly contact a lower end of the first slot when the first retractable lever is in the fully extended position; and
    a second clamping piece, the second clamping comprising:
        a second clamping jaw having a second opening, the second clamping jaw pivotably connected to the first clamping jaw;
        a second retractable lever defining a second handle and having a second slot, the second retractable lever being configured to slide within the second opening from a retracted position to a fully extended position; and
        a second spring tension mechanism fixed to the second clamping jaw, the second spring tension mechanism being configured to directly contact an upper end of the second slot when the second retractable lever is in the retracted position and directly contact a lower end of the second slot when the second retractable lever is in the fully extended position.

2. The towel clamp of claim 1, further comprising a pivot pin pivotally connecting the first and second clamping jaws.

3. The towel clamp of claim 2, further comprising a torsion spring mounted around the pivot pin to force the first and second clamping jaws together.

4. The towel clamp of claim 2, wherein the first clamping jaw has a first pair of lugs, the second clamping jaw has a second pair of lugs, and each lug has a hole that receives the pivot pin.

5. The towel clamp of claim 2, further comprising a rubber cylinder mounted around the pivot pin, wherein the rubber cylinder is configured to provide additional clamping force.

6. The towel clamp of claim 1, wherein the first spring tension mechanism provides constant pressure between the first clamping jaw and the first retractable lever, and the second spring tension mechanism provides constant pressure between the second clamping jaw and the second retractable lever.

7. The towel clamp of claim 6, wherein the first spring tension mechanism comprises a first screw and a first spring that are fixed to a first hole of the first clamping jaw, and the second spring tension mechanism comprises a second screw and a second spring that are fixed to a second hole of the second clamping jaw.

8. The towel clamp of claim 1, wherein the first retractable lever further comprises a first locking detent that is configured to engage an upper surface of the first clamping jaw to maintain the first retractable lever in the fully extended position; and wherein the second retractable lever further comprises a second locking detent that is configured to engage an upper surface of the second clamping jaw to maintain the second retractable lever in the fully extended position.

9. The towel clamp of claim 8, wherein the first retractable lever further comprises a first rounded nose edge, the first rounded nose edge allowing the first retractable lever to be tilted to engage the first locking detent with the upper surface of the first clamping jaw; and wherein the second retractable lever further comprises a second rounded nose edge allowing the second retractable lever to be tilted to engage the second locking detent with the upper surface of the second clamping jaw.

10. The towel clamp of claim 1, wherein the first and second retractable levers and the first and second openings have trapezoidal cross sections to slidably retain the first and second retractable levers within the first and second openings.

11. The towel clamp of claim 1, wherein the first and second retractable levers are slidably retained within the first and second openings via respective tongue-and-groove systems.

12. The towel clamp of claim 1, wherein the first and second spring tension mechanisms are configured to limit the travel of the first and second retractable levers.

* * * * *